United States Patent
Ai et al.

(10) Patent No.: US 11,868,142 B2
(45) Date of Patent: Jan. 9, 2024

(54) NAVIGATION ROUTE RESERVATION FOR WAREHOUSE ROBOT

(71) Applicant: HAI ROBOTICS CO., LTD., Shenzhen (CN)

(72) Inventors: Xin Ai, Shenzhen (CN); Hao Yang, Shenzhen (CN)

(73) Assignee: HAI ROBOTICS CO., LTD., Shenzhen (CN)

(*) Notice: Subject to any disclaimer, the term of this patent is extended or adjusted under 35 U.S.C. 154(b) by 0 days.

(21) Appl. No.: 17/384,640

(22) Filed: Jul. 23, 2021

(65) Prior Publication Data
US 2022/0057812 A1  Feb. 24, 2022

(30) Foreign Application Priority Data

Aug. 20, 2020 (CN) .......................... 202010840682.2

(51) Int. Cl.
*G05D 1/02* (2020.01)
*G01C 21/34* (2006.01)
*G05B 19/418* (2006.01)

(52) U.S. Cl.
CPC ......... *G05D 1/0297* (2013.01); *G01C 21/343* (2013.01); *G05B 19/41835* (2013.01); *G05D 1/0214* (2013.01); *G05D 1/0274* (2013.01); *G05D 1/0289* (2013.01); *G05D 2201/0216* (2013.01)

(58) Field of Classification Search
CPC .. G05D 1/0297; G05D 1/0027; G05D 1/0287; G05D 1/0289; G05D 1/0291; G05D 1/0214; G05D 2201/0216; G05B 19/41895; G05B 19/4061; G05B 2219/39167; G05B 2219/39146
See application file for complete search history.

(56) References Cited

U.S. PATENT DOCUMENTS

| | | | |
|---|---|---|---|
| 5,179,329 | A | 2/1993 | Nishikawa |
| 10,303,180 | B1 | 5/2019 | Prats |

(Continued)

FOREIGN PATENT DOCUMENTS

| | | |
|---|---|---|
| CN | 102830702 | 12/2012 |
| CN | 104133472 | 11/2014 |

(Continued)

OTHER PUBLICATIONS

The first Office Action of the priority CN application.
(Continued)

*Primary Examiner* — Spencer D Patton
(74) *Attorney, Agent, or Firm* — J.C. PATENTS

(57) ABSTRACT

The present disclosure discloses a method and system for assisting a robot to navigate in a warehouse setting. In some embodiments, robot is configured to receive a reserved route and move according to the reserved route as it navigates inside a warehouse. A reserved route includes one or more waypoints. Each waypoint represents a location and a size, the size being the space needed for accommodating a robot at the location. The one or more waypoints are listed in a sequence for a robot to follow sequentially. In some embodiments, each waypoint may further include a timestamp representing the time that the robot given the reserved route is supposed to arrive at the location.

16 Claims, 6 Drawing Sheets

(56) References Cited

U.S. PATENT DOCUMENTS

| | | | |
|---|---|---|---|
| 10,642,282 B2 | 5/2020 | Kichkaylo | |
| 10,725,462 B2 | 7/2020 | Voorhies | |
| 2007/0294029 A1 | 12/2007 | Raffaello | |
| 2012/0041677 A1 | 2/2012 | Raffaello | |
| 2014/0350831 A1* | 11/2014 | Hoffman | G05D 1/0027 701/117 |
| 2017/0017236 A1* | 1/2017 | Song | G08G 1/165 |
| 2017/0308070 A1* | 10/2017 | Elazary | G05B 19/41865 |

FOREIGN PATENT DOCUMENTS

| | | |
|---|---|---|
| CN | 106251016 | 12/2016 |
| CN | 106774305 | 5/2017 |
| CN | 107703943 | 2/2018 |
| CN | 107807640 | 3/2018 |
| CN | 108202965 | 6/2018 |
| CN | 108364100 | 8/2018 |
| CN | 108931981 | 12/2018 |
| CN | 109189081 | 1/2019 |
| CN | 109782718 | 5/2019 |
| CN | 110260875 A | 9/2019 |
| CN | 110737262 | 1/2020 |
| CN | 110989582 | 4/2020 |
| CN | 111459100 | 7/2020 |
| CN | 111708371 A | 9/2020 |
| EP | 2036014 B1 | 8/2015 |
| GB | 2559631 A | 8/2018 |
| JP | 2015006958 A | 1/2015 |
| JP | 2019136848 A | 8/2019 |
| KR | 100151141 B1 | 12/1990 |
| KR | 10-0151141 | 12/1998 |
| WO | WO2016129045 A1 | 8/2016 |
| WO | WO2018168289 A1 | 9/2018 |

OTHER PUBLICATIONS

The second Office Action of the priority CN application.
The EESR of the parallel EP application 21185930.
ISR of the parallel PCT application PC/TCN2021/099230.
The first OA of the parallel KR application No. 10-2021-0093036.
The first OA of the parallel JP application No. 2021-117039.
Notice of Allowance of the parallel application KR10-2021-0093036.

* cited by examiner

NAVIGATION ROUTE RESERVATION FOR WAREHOUSE ROBOT

CROSS-REFERENCE TO RELATED APPLICATIONS

This application claims priority to Chinese Patent Application No. 202010840682.2, filed on Aug. 20, 2020, which is hereby incorporated by reference in its entirety.

TECHNICAL FIELD

The present disclosure relates generally to controlling and managing a warehouse robot, and more specifically to reserving a navigation route for a warehouse robot.

BACKGROUND

Robots or robotic machines are increasingly utilized in warehouses. Besides lifting heavy materials, automated warehouse robots are taking over duties that used to require human operators, for example, moving materials or boxes to a designated location or fetching an item from an identified shelf. As more and more robots are utilized in large warehouses, accurate and real-time navigation is required to ensure safety and efficiency.

In the prior art, automated guided robots rely on route reservation to move inside a warehouse. Often a route is a collection of pre-reserved line segments for an automatic guided vehicle or robot to move along. Route reservation methods in the prior art are not designed for busy warehouses where many robots may be moving in the same direction in a common pathway or inside an aisle between warehouse shelves. Route reservation methods in the prior art are inefficient and need improvements.

SUMMARY

The present disclosure discloses an improved route reservation method and a system for automated guided robots to navigate safely inside a warehouse crowded with robots.

Accordingly, an object of the present disclosure is providing an improved method and device for an automated guided robot to navigate inside a warehouse.

In some embodiments, a method for moving an automated guided robot includes receiving a path by the automated guided robot through path reservation, storing the path and then moving along the path. The path includes one or more waypoints that are listed in sequence and the automated guided robot moves along the path by reaching each of the one or more waypoints sequentially.

In the present disclosure, a waypoint refers to a spot where the automated guided robot needs to stay inside a warehouse. Waypoints can be set based on different rules, for example, corresponding waypoints can be set based on whether the automated guided robot needs to change its posture (for example, turning), whether the automated guided robot needs to stay and wait for a predetermined time, and whether the automated guided robot needs to fetch and release materials. The designation of waypoint includes a location and a size.

In some embodiments, an automated guided robot receives a first path that includes one or more waypoints through path reservation. The automated guided robot may move along the first path by reaching each of the one or more waypoints sequentially. Before the automated guided robot reaches the end of the first path or when the automated guided robot is at the end of the first path, it receives a second path, wherein the second path is obtained by a server sending second path related information to the automated guided robot after the automated guided robot makes a path reservation request again, or by the server automatically sending the second path related information to the automated guided robot after a real-time update. The second path includes one or more waypoints. The automated guided robot stores the second path and is configured to move along the second path by reaching each waypoint in the second path sequentially.

In some embodiments, the automated guided robot marks the first path as completing when it reaches the end of the first path. In some embodiments, if the automated guided robot reaches the end of the first path before receiving the second path, the robot stays at the end of the first path. In one embodiment, the robot may send a request of the second path if it reaches the end of the first path before receiving the second path. In another embodiment, the robot may wait at the end of the first path for a pre-determined time period before sending a request of the second path.

In some embodiments, the designation of a waypoint may further include a timestamp. The timestamp indicates the time the automated guided robot should reach the location of the waypoint. In some embodiments, the designation of a waypoint may further include an orientation for the robot to adopt. In some embodiments, the designation of a waypoint may further include a movement instruction for the automated guided robot to move. For example, the robot may be instructed to move straight or laterally. The robot may also be instructed to change direction, for example, to rotate.

In the present disclosure, two paths assigned to two robots may cross each other at a physical location. However, such crossed paths may not lead to collision between two automated guided robots if the two paths do not collide. In the present disclosure, a collision between two paths occurs if there is an overlap between a waypoint on the first path and a waypoint on the second path. In some embodiments, the designation of each waypoint includes a location, a size and a timestamp. Two waypoints overlap if there is an overlap between the two locations and the two timestamps, which means the robots would arrive at the approximately same location at the same time.

In the present disclosure, a robot is configured to release a path assigned to it after the robot reaches the end of the path. The robot may also release each waypoint the robot passes when it moves along an assigned path. A waypoint that is marked as being released from reservation will not "collide" with any other waypoint.

In some embodiments, an automated guided robot is configured to navigate in accordance with the above described method. Software programs may be stored in a computer-readable non-transitory medium and can be loaded onto the robot to instruct the robot to navigate in a warehouse setting. In some embodiments, circuits with embedded software or programmable integrated circuits, e.g., field-programmable gate array (FPGA), are configured to perform the above described method when programmed instructions are executed.

In the present disclosure, an innovative route reservation method is disclosed to improve safety and efficiency in a warehouse automated by robots. In related art, to avoid collision, if a location point is included in a reserved route, a route request that includes the same location point will be rejected or delayed until the entire reserved route has been released. In some embodiments disclosed herein, the concept of waypoint is introduced. A waypoint can be included in two reserved routes. There will not be any collision if the two robots arrive at the waypoint at different times. In some embodiments, a waypoint is released after the robot passes the waypoint. A released waypoint can then be included in another reserved route. In this way, the second reservation request can be processed before the first reserved route is released. Therefore, the disclosed apparatus, systems, and methods provide more efficient route reservation for busy and crowded warehouses that utilize many robots.

BRIEF DESCRIPTION OF DRAWINGS

These and other features of the present disclosure will become readily apparent upon further review of the following description and drawings. In the drawings, like reference numerals designate like parts throughout the drawings. Moreover, components in the drawings are not necessarily drawn to scale, the emphasis instead is placed upon clearly illustrating the principles of the present disclosure.

DESCRIPTION OF EMBODIMENTS

Embodiments of the present disclosure are described more fully hereinafter with reference to the accompanying drawings, in which preferred embodiments of the present disclosure are shown. The various embodiments of the present disclosure may, however, be embodied in many different forms and should not be construed as limited to the embodiments set forth herein. Rather, these embodiments are provided so that the present disclosure will be thorough and will fully convey the scope of the present disclosure to those skilled in the art.

Figure 1:
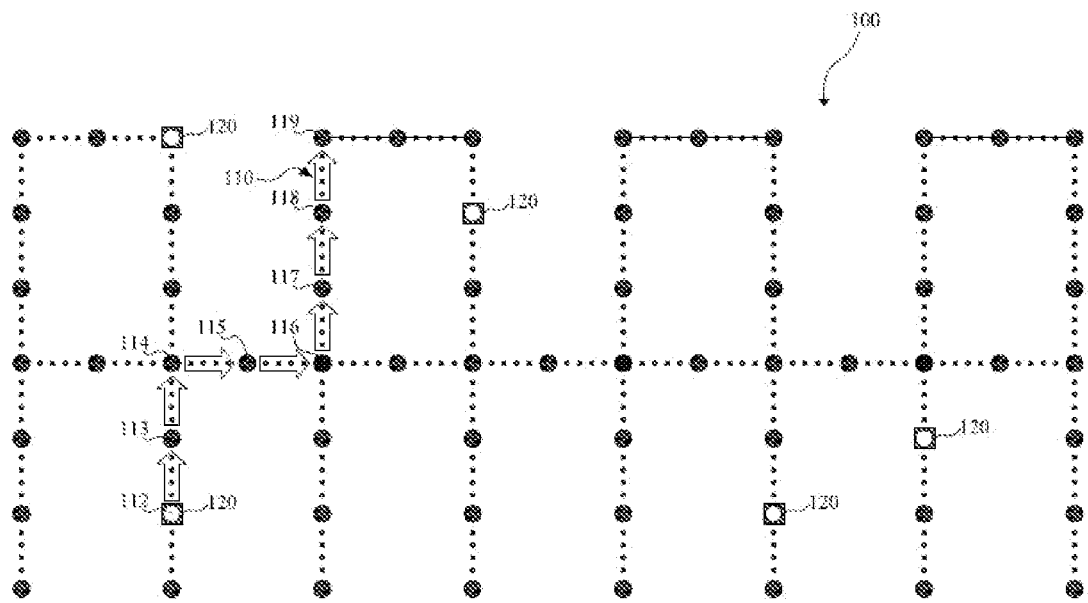
FIG. 1 is an illustration of a warehouse setting in which a guided robot moves along a reserved path.

FIG. 1 illustrates a warehouse where a plurality of robots is deployed. A grid 100 can be stored in a server of a system for guiding an automated guided robot (the grid can be, for example, a path setting displayed in the form of data mapping), set on the floor of the warehouse, or stored in the server of the system for guiding an automated guided robot and set on the floor of the warehouse, and the robots 120 move along the grid lines as they navigate from one position to another inside the warehouse, or the robots 120 perform a multi-channel interspersed movement on channels formed by the grid according to a planned route or a reserved path. For example, a robot 120 may be instructed to go to a shelf to fetch a storage box or storage bin and drop the storage container at a designated location. Robots 120 can also be instructed to unpack material containers that have arrived at the dock and distribute the content in the containers to storage bins. As robots 120 move around inside the warehouse to execute the instructions they receive, they must navigate around shelves and avoid colliding with other robots.

The robots 120 may be configured to navigate autonomously. For example, when a robot 120 receives an instruction for completing a task, it first obtains the starting and ending location based on the task instruction. In one embodiment, the instruction itself may include the starting and ending location. In another embodiment, the robot 120 may derive the starting location and/or ending location based on the task. For example, if the task is to fetch a storage bin and bring the storage bin to a workstation, the robot 120 may use the location of the workstation as the ending location. The location of the workstation may have been stored in the memory storage of the robot 120 during system initialization. Alternatively, the location of the workstation may be received from a remote server (not shown) in response to a query from the robot 120. In some embodiments, the starting location of the task is the current location of the robot 120. In some embodiments, the starting location of the task is the location of the storage bin.

It is noted that in the below description, when a robot is said to have received an assigned path or a reserved route, the path or route may be sent by a central server for dispatching the robot or a reservation server for reserving positioning-route. Optionally, the path or route can also be formed and reserved by coordination between robots, or managed by a robot with higher authority among the robots.

Based on the starting and ending location, a navigation path 110 may be determined, either by the robot 120 or by a remote server. As shown in FIG. 1, the navigation path 110 includes one or more waypoints, W112, W113, . . . , and W119. Each waypoint W represents a physical location P inside a warehouse facility. Each waypoint W also includes a size r. For example, a waypoint W may be designated as (P, r). The physical location P can be expressed using the coordinates of the location in a two-dimensional grid, e.g., (x, y). The waypoint can be a circle or a square. Accordingly, the size r of the waypoint can be expressed as the radius of a circle centered at P or the length of the side of a square centered at P. In addition, the waypoint can take other shapes, for example, triangle, rectangle, or rhombus, etc. Accordingly, the size r of the waypoint can be expressed differently. Inside a warehouse, waypoints may be of the same or different geometric shapes, and the waypoints that instruct the robot to perform different postures usually have different shapes. For example, the waypoint where the robot turns, the waypoint at which the robot changes in such as a fetching device or a mechanical arm, the waypoint where the robot has no load, the waypoint where the robot is loaded, or the waypoint where the robot stays and is inactive, all may have different shapes. In addition, the waypoints corresponding to different robots will have different shapes.

In some embodiments, a task instruction includes a reservation mode of the robot at each waypoint, and at least includes but not limited to walking, stopping, turning, fetching, releasing, adjusting an action of a part with a mechanism and other instructions.

In some embodiments, the reserved path includes waypoints and reserved points for forming a walking route between the waypoints. When the robot moves along an assigned path, it can release each waypoint/reserved point/ path it has passed. Specifically, in some embodiments, when the robot moves along the assigned path, the robot can release waypoints/reserved points/paths it has passed, and send the information of the released waypoints/reserved points/paths to the server. After the server receives the information, it schedules the relevant paths. In some embodiments, when the robot moves along the assigned path, the server receives the position information sent by the robot in real time, analyzes the position of the robot to determine a waypoint/reserved point/path to be released, and releases it. In some embodiments, when the robot moves along the assigned path, the server maps a digital map based on the information fed back by the robot, analyzes the position of the robot to determine the waypoint/reserved point/path to be released, and releases it.

In some embodiments, when the robot moves along the assigned path, the robot performs information handshake with the surrounding robots through wireless communication (that is, the robot and its surrounding robots learn each other's information through wireless communication and perform information interaction) to complete the release of the waypoint/reserved point/path. In some embodiments, when the robot moves along the assigned path, another robot may act as an arbitrator to assist in determining the waypoint/reserved point/path that needs to be released so as to complete the release. By releasing the waypoint/reserved point/path that has been passed, the burden on the system is effectively reduced and the safety factor is significantly improved.

In some embodiments, the robot releases each waypoint it passes through in real time, but the waypoint where the robot is when the robot stops will not be released, and at the same time the robot reserves the point to be passed, where "release in real time" means that when the robot passes a certain waypoint, it immediately releases the waypoint. In other embodiments, the robot may release a path (including the waypoints passed) when it passes over the path, for example, when it reaches a designated location; and at the same time the robot reserves the path to be passed. The waypoints that have been released from the reservation are marked as not "collide" with any other waypoints. By releasing the waypoints or paths in real time, the server has more scheduling options of waypoints.

In some embodiments, the server performs path planning for each robot. The robot sends a reservation request of waypoints to be passed to the server, and the server reserves the waypoints to be passed by the robot according to the current path. When the reservation fails, the server will make an reservation again until the reservation is successful, and provide the robot with path information of successfully reserved waypoints. After the robot receives the relevant information, it will perform subsequent actions. For example, when the robot reserves a path a→b→c→d, that is, when it passes through the four waypoints a, b, c, and d in sequence, if the robot fails to reserve waypoint c, then the robot will send a new path reservation request to the server before the robot reaches the waypoint c. When the robot receives the corresponding path information, if the robot accepts this path indication information, then the robot, after receiving new path information, re-plans the path; and if the robot does not accept this path indication information, it will feed back to the server and wait for the server to send the updated path indication information.

The path planning, path reservation, path release, initiation of reservation request, and determination of path collision can be performed by any one of the server and the robot.

In some embodiments, the robot itself can perform path planning, waypoint reservation, determine whether the waypoint reservation is successful, and correspondingly determine whether it needs to make a reservation again or perform follow-up actions according to the reserved waypoints.

In some embodiments, the robot performs an information handshake with the surrounding robots through wireless communication, to complete the path planning, waypoint reservation, and determination of whether the waypoint reservation is successful, and correspondingly determines whether it needs to make a reservation again or perform the follow-up actions according to the reserved waypoints.

In some embodiments, the robot can be assisted by other robots to complete the path planning, waypoint reservation, determine whether the waypoint reservation is successful, and correspondingly determine whether it needs to make a reservation again or perform the follow-up actions according to the reserved waypoints.

In some embodiments, the robot can analyze the relevant data sent by the server and thus complete the path planning, waypoint reservation, determine whether the waypoint reservation is successful, and correspondingly determine whether it needs to make a reservation again or perform the follow-up actions according to the reserved waypoints.

The reservation request includes requesting reservation of each waypoint so as to make a path reservation, and the path reservation may include one or more path reservations. The path reservation(s) is that the server starts from the point where the robot starts to move, and proceeds sequentially according to the waypoints in the path, until the reservation fails. Then the server feeds back the information of all waypoints that have been successfully reserved to the robot, and the robot advances along the waypoints that have been successfully reserved, and continues to reserve waypoints to be passed while advancing.

A range of the path reservations can be dynamically adjusted, that is, the number of waypoints reserved each time can be different.

In some embodiments, the size r is the maximum projection area of the whole robot (including shelves, fetching devices, etc.) on the ground, including the maximum projected areas when moving and stationary, when turning and not turning, when loaded and unloaded, and when fetching and releasing a material.

In a three-dimensional space, the posture of the robot 120 and the three-dimensional posture of the material shelves are included. With the introduction of the three-dimensional space, when the sizes of two or more robots 120 at the same time stamp are overlapped with each other, the two or more robots may not collide. For example, two robots 120 may cross at different heights, but do not collide.

In some embodiments, when one robot 120 extends a fetching device at height h1, while another robot at a waypoint adjacent to the robot 120 extends a fetching device at height h2 (where the height h1 is different from the height h2), that is, when the above two robots (for example, two robots located in two adjacent material fetching channels and facing each other) respectively extend their fetching devices into different layers of the same shelf to fetch the materials, although the sizes r of the waypoints of the two robots may be overlapped, the two robots will not collide at this time. In other embodiments, one robot 120 extends the fetching device at height h1, and another robot at a waypoint adjacent to the robot 120 extends the fetching device at height h2 (where the height h1 is different from the height h2) and turns so that the sizes r of the waypoints of the two robots are overlapped, but the two robots will not collide. With the introduction of the three-dimensional space, high matching of waypoints with robots can be realized, the utilization rate of the waypoints can be improved, and thus the working efficiencies of the robots can be improved. In related art, a navigation route includes line segments and points. The size of the robot is not taken into consideration during navigation planning. However, in a busy or crowded warehouse where many robots are employed, it may be necessary to design parallel lanes in which two robots may be moving abreast. In a complex environment where robots are not of the same size or where the corners are tight, the size of a robot is an important factor that needs to be taken into consideration during navigation planning. For example, in a relatively tight corner, large robots may not pass through and become stuck. In the method and system disclosed herein, the size of the robots 120 are taken into consideration during navigation planning and route reservation. In the present disclosure, a route is not represented by a simple line segment. In some embodiments, when a robot 120 receives an assigned path based on a given task, the assigned path includes a list of one or more waypoints W. Each waypoint is represented by a location and a size. The list of the waypoints represents a sequence of waypoints for the robot 120 to traverse.

In some embodiments, there are regular points in addition to waypoints in the path.

The regular points can be one or more of the following:
(1) normal points: used as a basis for calculation of walking paths, robot positioning, etc.; map starting points and boundary points for correction; and status points for providing path status information;
(2) path and waypoints formed by map route regularization: the map includes a walkable range and its range boundary, and through a mapping relationship between the robot position, starting and the end points of the task and the map, more than one path that the robot can walk are established, and through regularization calculation, a walking route is corrected to a straight and/or non-straight walking path based on factors such as the walkable range, allowable walking time and distance, straight and non-straight walking patterns; and
(3) waypoints obtained by regularization calculation of the three-dimensional space: walking and actions of the robot need to occupy a certain space, and by combining with the time dimension, the space occupied by the robot entity is mapped to a digital multidimensional space through spatial regularization calculation, and the required space parameter is set into the size r parameter of the path waypoint; where the size r parameter needed by the action of the robot can be corrected by robot perception of environment, in combination with robot operation scene, multi task cooperation, depth recovery of robot navigation obstacle avoidance environment, perception of target or three-dimensional reconstruction of surrounding robots, etc., and in combination with at least one of robot regularization learning method and neural like learning method.

In some embodiments, a path may include a list of waypoints as shown in FIG. 1. In some embodiments, a path may include line segments or markers in addition to a list of waypoints. The line segments are located between two adjacent waypoints in the path, and the markers are used to indicate that the robot can change its posture during walking in the path, or are used to indicate that the walking in the path has been completed.

The form of path construction can be at least one of the following:

(1) completely constructed by waypoints, each waypoint operates according to the aforementioned settings; and
(2) composed of waypoints combined with at least one of reserved points, line segments, markers, and regular points, where the line segments and markers can be physical or virtual, and one or both of them can be laid out. A walking direction of the robot and a walking distance in a road segment are indicated by identifying the line segments, and the robot is directly positioned and/or is instructed to adjust to a specific posture though the markers. The specific posture can be a waypoint posture generated according to the task, or it can be set according to environmental requirements. For example, if a path is about to approach an assembly line transmission platform, the robot must firstly lower the fetching device to the lowest position so as to avoid the fetching device to hit the platform when the robot is walking.

Figure 2A:
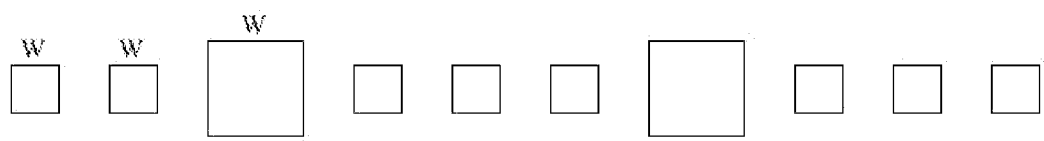
FIGS. 2a-2f illustrate exemplary routes including multiple waypoints.
Figure 2B:
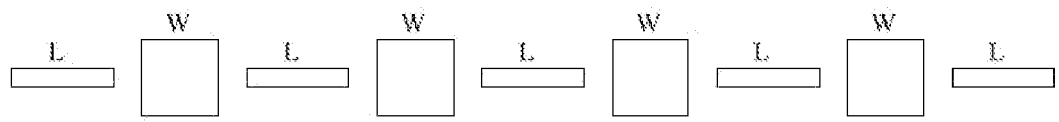
Figure 2C:
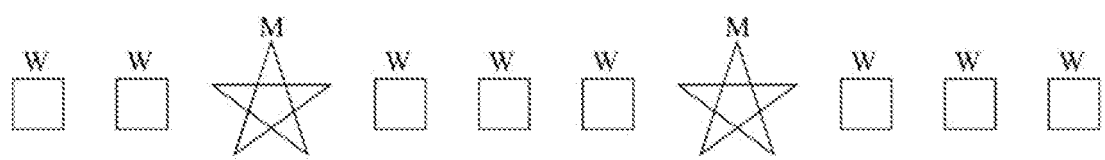

FIG. 2*a*-FIG. 2*c* illustrate three exemplary paths. In FIG. 2*a*, the exemplary path 202 includes one or more waypoints. The path 202 is represented as a sequence of waypoints W for a robot 120 to traverse. In FIG. 2*b*, the exemplary path 204 includes one or more waypoints W and several line segments L. In FIG. 2*c*, the exemplary path 206 includes one or more waypoints W and several markers M that are placed in the warehouse facility for navigation purpose.

In some embodiments, a waypoint may include a movement instruction for the robot 120 to move. Examples of a movement instruction include "move straight," "move laterally to the right," "move laterally to the left," "rotate 180° counter-clockwise," "rotate 0-90° counter-clockwise," or "rotate 0-90° clockwise," etc. In some embodiments, a movement instruction may be "change moving direction from 90° west to 45° north," which instructs a robot to change its moving direction. The robot may be configured to change its moving direction by rotating to face the new moving direction. Alternatively, the robot may be configured to simply move along the new direction without turning.

Figure 2D:
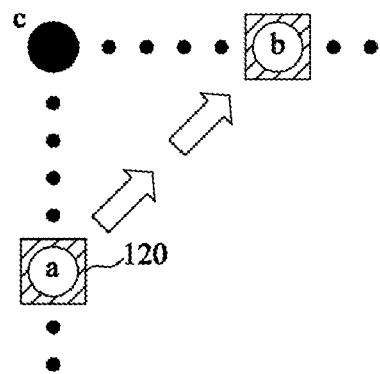

As shown in FIG. 2*d*, optionally, from point a to point b, the robot 120 receives a movement instruction indicating a movement mode as follows: rotating clockwise by a certain angle at the point a, and moving toward the point b in a straight line.

Figure 2E:
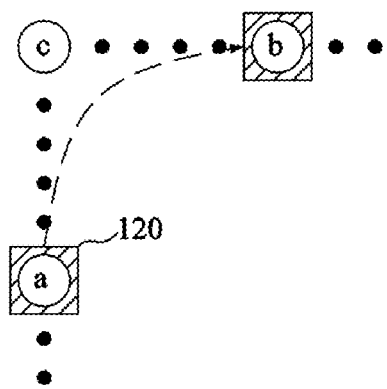

As shown in FIG. 2*e*, optionally, from point a to point b, the robot 120 receives a movement instruction indicating a movement mode as follows: starting at the point a, gradually rotating clockwise, and moving toward point b in an arc. Further, if there is a robot at point c, it should be considered that it will not affect the operation of the robot at the point c.

Figure 2F:
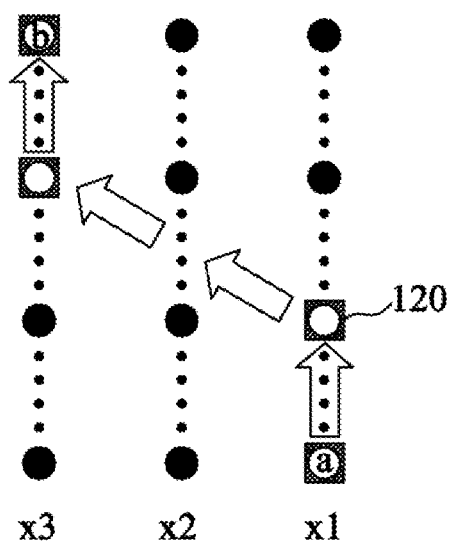

As shown in FIG. 2*f*, optionally, the robot 120 has multiple feasible channels and is planned side by side. The robot 120 can reach point b of channel x3 from point a of channel x1, and can cross channel x2 from any one point of channel x1 and reach channel x3 during travelling, forming an interspersed travel mode in multiple channels, and then turn to point b on channel x3 to advance.

Figure 3:
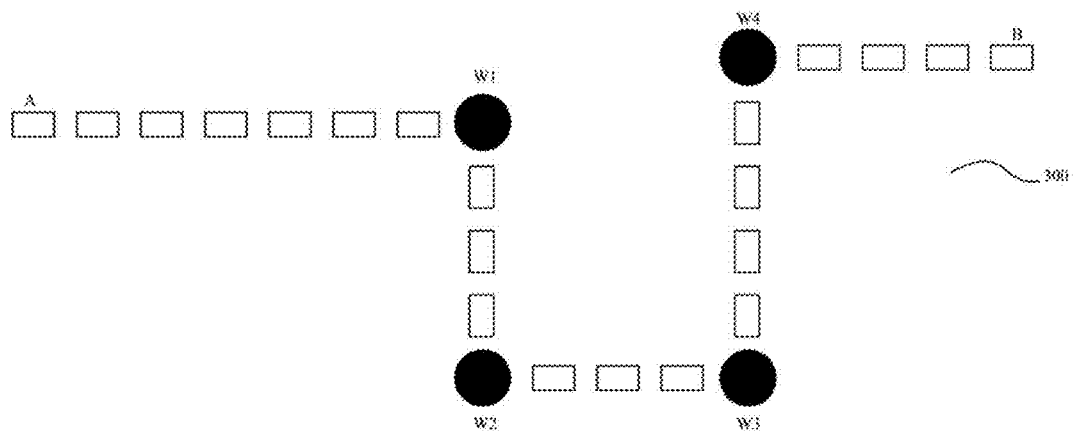
FIG. 3 illustrates an exemplary route where a guided robot moves in a reserved route under navigation guidance.

In FIG. 3, four waypoints W1, W2, W3, and W4 are included in a planned path 300. Each waypoint includes a movement instruction that directs the robot 120 how to move when the robot 120 reaches the waypoint. For example, in FIG. 3, a robot 120 may start from the leftmost point A and move horizontally towards right. When robot 120 reaches the waypoint W1, the waypoint W1 instructs the robot 120 to turn 90° clockwise so that the robot 120 would start move southward along the vertical line segment. Similarly, the waypoints W2, W3, and W4 each include a rotation instruction that directs the robot 120 to turn onto the next segment until it reaches the destination B.

Figure 5:
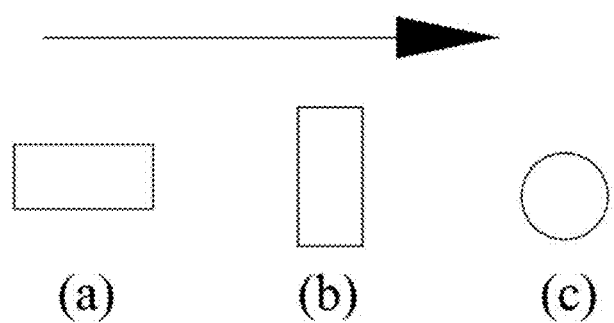
FIG. 5 illustrates an exemplary route reserved for a guided robot.

In some embodiments, each waypoint includes a posture indication, which is used as an instruction for the robot 120 to take a certain pose or orientation. For example, FIG. 5 illustrates three posture indications. Each posture indication is an instruction for a robot 120 to take a certain pose while moving towards the right side as indicated by the arrow. The posture indication (a) is an indication that the robot 120 should face sideways while moving horizontally towards the right. This pose may be necessary for the robot 120 to adopt, e.g., when the robot 120 passes through a narrow space or when the robot 120 tries to avoid running into another robot. In posture indication (b), the robot 120 faces forward in its moving direction, which may be regarded as the normal pose. In posture indication (c), the robot is instructed to stay in the same spot without moving. Posture indications can be stored in the system or on the floor as markers for robots to scan or read. Posture indications may be sent as through wired or wireless transmission as well.

In some embodiments, a waypoint may be represented in both space and time dimensions. Each waypoint may further include a time stamp, in addition to a location and size. The time stamp indicates to the robot 120 at what time it needs to arrive at the physical location of the waypoint. With this added time dimension, more complex scheduling can be achieved in a busy warehouse. For example, two robots can be scheduled to pass through a same location at different times safely without collision. During route reservation, each robot receives a reserved path that includes one or more waypoints. Both paths include a waypoint that identifies a same physical location but with a different timestamp. After receiving the reserved route, each robot follows the navigation route and passes through the same physical location at different times indicated by the timestamps. Without the time dimension, it cannot be predicted or controlled when a robot passes or reaches a waypoint. If waypoints are represented in the space dimensions only, when two reserved routes assigned to two robots share a same waypoint, there is a possibility that the two robots reach the same waypoint at the same time, causing collision. For safety, a route reservation request will be rejected if the request includes a waypoint that is already included in a reserved route. Introducing the time dimension into the representation of a waypoint makes it possible to include the same waypoint in two reserved routes, thus improving efficiency.

In some embodiments, when the robot sends a path reservation request to the server and the path reservation request includes the current task weight information of the robot itself, the server sends the path instruction information to the robot according to the task weight information of the robot itself. In some embodiments, when the robot sends a path reservation request to the server and the path reservation request includes robot related task information, the server determines the task weight information of each robot according to the related task information, and sends path indication information to the robot. The task weight information includes: the time sequence in which each robot sends the path reservation to the server; and the priority of each robot to fetch and release the materials, the number and weight of the materials loaded by the robot, the moving speeds of the robots, when different robots arrive at the same waypoint at the same time stamp. With the introduction of the task weight information, the server provides the relevant path instructions to the robots, so that each robot can run more orderly, efficiently and safely.

For safety reasons, if the route reservation request contains waypoints that have been included in the reserved route, the route reservation request will be rejected. The introduction of the time dimension into the representation of the waypoints can make the same waypoint included in two reserved routes, thereby improving efficiency.

Figure 6A:
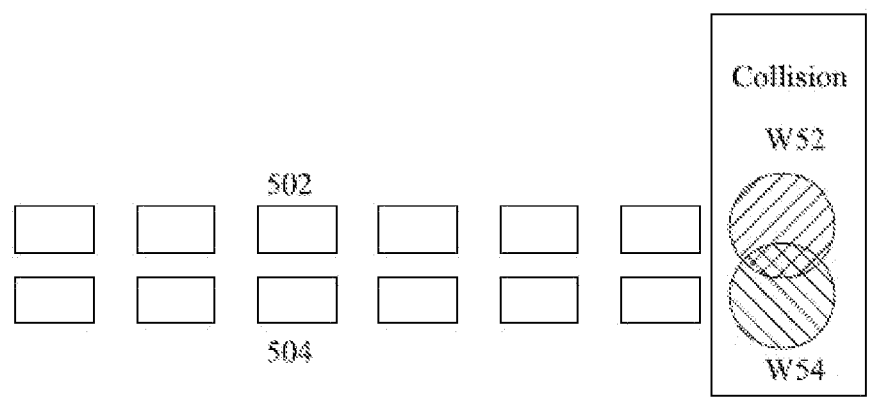
FIGS. 6a and 6b illustrate exemplary waypoints.
Figure 6B:
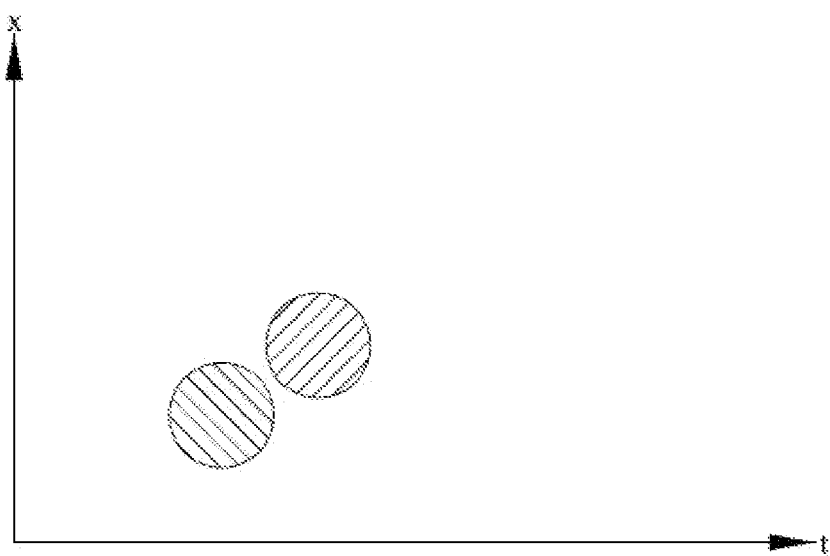

The present disclosure introduces waypoints in route reservation for warehouse robots to improve safety and efficiency. By using waypoints, managing and controlling automated guided robots become easier and simpler. For example, two robots each moving along an assigned path will not collide into each other if the two assigned paths do not overlap, i.e., sharing one or more waypoints. FIGS. 6a-6b illustrates examples of "overlapping" waypoints in the space dimensions and in the space-time dimensions.

In FIG. 6a, two paths 502 and 504 run parallel. The two paths do not cross each other except for the overlapping waypoints W52 and W54, where the two robots come to a station point, and a posture of the robot can be adjusted by the posture indication. The station point, for example, may be a target point, an intermediate point or a turning point of the path, or other waypoint. In some embodiments, each of the waypoints W52 and W54 may include a location P and a size r. Because the size r of a waypoint represents the size of the robot, the overlapping of W52 and W54 means that the two robots would bump into each other, causing collision.

The cases where the waypoints W52 and W54 overlap in the path mainly include the following three cases: the first case is a path conflict, and specifically, following the path extension in parallel, one or both of the two robots suddenly change to form an overlapping at the position P; the second case is that one or both of the two robots have a posture change at their respective positions P (the posture change may include, for example, a change in direction of a fork, a robot arms, or a movable chassis), such that their sizes r overlap; and the third case is that the time stamps t of the two robots are the same in the first case, the second case, or a combination of the two cases. For example, in one scenario, the location of W52 and the location of W54 are different, and in related art route reservation techniques, paths or routes are presented by dimensionless lines or points, therefore, navigation planning in related art cannot detect or prevent collisions when the paths assigned to two robots do not cross but the paths do not leave enough room to accommodate the size or sizes of the robots.

In some embodiments, each waypoint includes a location P, a size r, and a time stamp t. As far as three-dimensional space is concerned, the size r of each waypoint corresponds to the space occupied by the robot when it moves, and if the size r of two waypoints occupies different three-dimensional spaces at the same time stamp t, they will not collide. If W52 and W54 do not overlap when plotted in a space-time coordinate system as shown in FIG. 6b, that means the two robots will avoid collision because, for example, they pass through the same location at different times. The transverse coordinate t in FIG. 6b is a walking time of the robot, and the longitudinal coordinate p is a walking position of the robot, and the longitudinal coordinate p is a two-dimensional coordinate formed by the position p combined with the time stamp t in a function, so as to present a corresponding relationship between the position and time, and a relationship between position and time stamp can also be expressed by double two-dimensional calculation of two two-dimensional coordinates, i.e., x-axis position/time stamp t and y-axis position/time stamp t, or by three-dimensional calculation of x-y-axis position/time stamp t.

Here, a material box handling robot and a shelf handling robot operating in the same warehouse are taken as examples for description. The structure of the material box handling robot is shown in FIG. 9.

Figure 9:
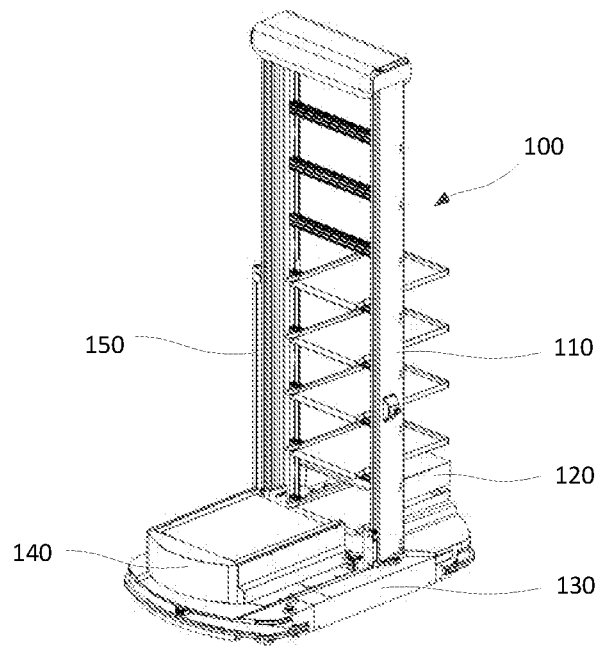
FIG. 9 is a schematic structural diagram of a material box handling robot.

In FIG. 9, a structure of a material box handling robot 100 includes a robot body 110, a plurality of storage unit 120 arranged on the robot body, an adjusting component 150 arranged on the robot body 100, and a handling device 140. The adjusting component 150 is configured to drive the handling device 140 to move up and down, and in combination with the rotation of the handling device 140 around an axis in a vertical direction, the orientation of the handling device 140 can be adjusted, so that the handling device 140 can be aligned with any storage unit 110 or the storage location of the storage shelf where the target object is located. The handling device 140 is used for loading or unloading the target object to handle the target object between the storage shelf and the storage unit.

A structure of the shelf handling robot (see U.S. Pat. No. 10,486,901B2) includes: a mobile base, the top of which is provided with a lifting mechanism that can enter the bottom of the shelf whose bottom height is higher than the height of the robot. The lifting mechanism supports and holds the shelf, and is combined with the moving function of the mobile base, so that the shelf is driven to move along with the movement of the shelf handling robot.

Waypoints on paths of the material box handling robot and the shelf handling robot have adjacent W52 and W54. At the same time stamp, the material box handling robot rotates the fetching device at w52, while the shelf handling robot moves at W54 with no load (no support shelf) or with a shelf with a low supportable height, and in some embodiments, the shelf handling robot will walk under the fetching device of the material box handling robot, and in this case, although their projections are overlapped, they do not interfere with each other in the three-dimensional space, and thus it is estimated that they will not collide.

In some embodiments, if two robots are material box handling robots and operate their fetching devices at the same time stamp and at adjacent w52 and W54, where the fetching device of one robot operates on the upper part of the one robot, the fetching device operates of the other robot on the lower part of the other robot, and movement spaces of the two fetching devices do not intersect each other, and thus it is estimated that they will not collide.

In some embodiments, if two robots perform a handshaking operation in structure according to a task requirement, although their projections are overlapped and they are in contact with each other in the three-dimensional space, this is task requirement and it is not considered as collision, but it should be estimated whether there is mutual interference other than the contact, in the three-dimensional space, so as to help predict the safety of the handshaking operation.

Figure 7:
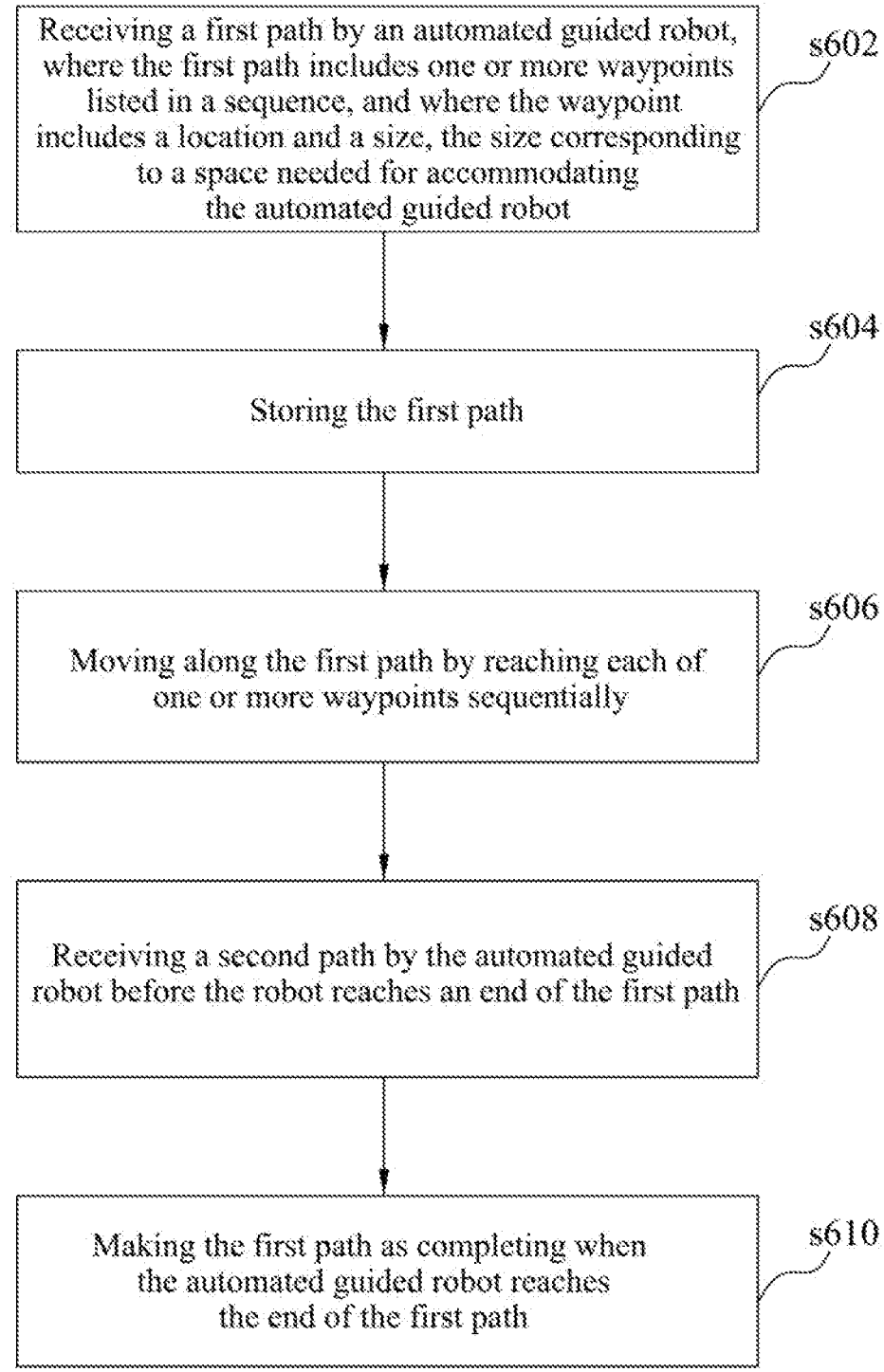
FIG. 7 is a flowchart illustrating a route reservation method in accordance with an embodiment of the present disclosure.

Waypoints that include a location, a size, a posture indication, and/or a time stamp can be used to facilitate route reservation. FIG. 7 is a flow chart illustrating an exemplary route reservation method.

In step 602, an automated guided robot 120 receives a first path. The first path may be generated by the robot 120 or a remote server (see 750 in FIG. 8b). The first path includes one or more waypoints listed in a sequence. In some embodiments, each waypoint includes a location and a size. The size corresponds to the space needed for accommodating the automated guided robot 120. The robot 120 stores the first path in step 604 and starts navigation by moving along the first path (step 606). The robot 120 reaches each of the one or more waypoints sequentially (step 606). In one embodiment, before the robot 120 reaches the end of the first path, it receives a second path (step 608). When the robot 120 reaches the end of the first path, it marks the first path as completing (step 610). The waypoints included in the first path are released. The robot 120 then continues its navigation along the second path in the same manner as the first path.

Under certain scenarios, the robot 120 may fail to receive the second path when it reaches the end of the first path. When the robot 120 fails to receive the second path when it has reached the end of the first path, the robot 120 may stay at the end of the first path and wait for a pre-determined time period or change the reserved path. If the reserved route is not changed, after the pre-determined time period has elapsed, the robot 120 may send a request for the second path. In one embodiment, this request may be transmitted to a remote server if a server is relied upon in route reservation. In another embodiment, the request may be sent to a different functional module implemented locally at the robot 120.

In some embodiments, the walking distance (or waypoints) that can be reserved includes the farthest distance (or waypoint) that the robot runs from the current position at the maximum speed until the robot stops.

In some embodiments, the waypoints that can be reserved include waypoints at which the robot must stop during moving forward from the current position along the path. In some embodiments, there are several definitions of the waypoints at which the robot must stop: (1) waypoints that the robot needs to stop to perform a corresponding action; (2) waypoints that the robot needs to stop to cooperate with manual operation.

In some embodiments, the walking distance that the robot can reserve includes waypoints that the robot must stop, then the robot can only reserve the distance to the waypoint that the robot must stop. For example, if the robot intends to reserve a distance of 5 waypoints, and if a distance to the nearest waypoint is only 2 waypoints away, then the farthest distance that can be reserved is only 2 waypoints away.

In some embodiments, waypoints in some areas of a route are combined into a group, and after the robot intends to reserve one of the waypoints and sends a reservation request to the server, the server receives the reservation request and determines whether the waypoint to be reserved is in a group. If it is in a group, the group is firstly reserved. If the reservation for the group is successful, it can be continued to reserve or not reserve a waypoint in the group. When the robot successfully reserves the group through the above reservation method, other robots cannot make reservations for any waypoint in the group. For example, group 1 includes waypoints A, B and C, and after the robot successfully reserves group 1, when other robot makes a reservations for group 1, the server will send feedback information that group 1 and all waypoints contained therein cannot be reserved.

In some embodiments, when the robot successfully reserves a certain group and continues to make a reservation for a waypoint in the group, other robot cannot make reservations for other waypoints in any group including the waypoint. For example, group 1 includes waypoints A, B and C, group 2 includes waypoints A and D, and group 3 includes waypoints C and E. When the robot successfully reserves waypoint A, since both group 1 and group 2 include waypoint A, other robot cannot reserve other waypoints (such as waypoints B, C and D) in groups 1 and 2, but can reserve a waypoint near them, such as waypoint E. After leaving all waypoints in a group, the robot releases the corresponding group and waypoints therein. By introducing the relevant solution of "group reservation" into the route reservation of robots, conflicts between the robots can be more effectively prevented and the safe operation of the robots can be ensured.

Figure 4:
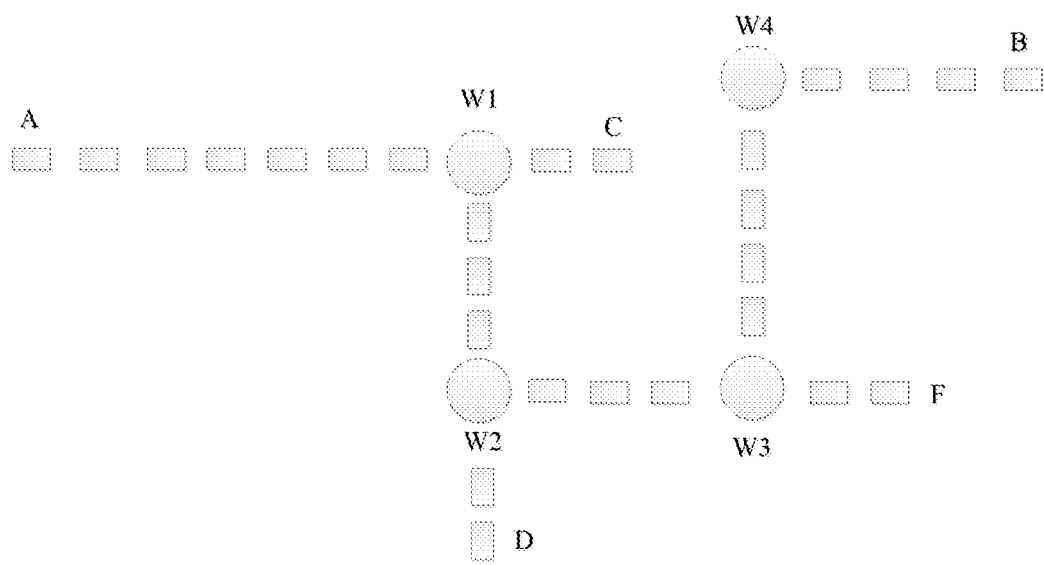
FIG. 4 illustrates an exemplary route where a "redundant reservation" is made for a guided robot.

In some embodiments, the robot makes reservations for waypoints to be passed based on a principle of "redundant reservation", where "redundant reservation" is to make reservations for several adjacent points after the farthest waypoint in waypoints to be reserved, in addition to the waypoints that the robot will pass through. In this way, a straight line conflict between robots is avoided, and safe operation of the robots is more effectively guaranteed. As shown in FIG. 4, if waypoint 1 to be reserved is in the same group as all waypoints to waypoint C, waypoint C will be reserved at the same time. If waypoint 2 and waypoint D are in the same group, waypoint D will be reserved at the same time. If waypoint 3 and waypoint F are in the same group, waypoint F will be reserved at the same time. At this time, a reservation range includes: waypoints A-C; waypoints 1-D; waypoints 2-F; waypoints 3-4; waypoints 4-B.

Figure 8A:
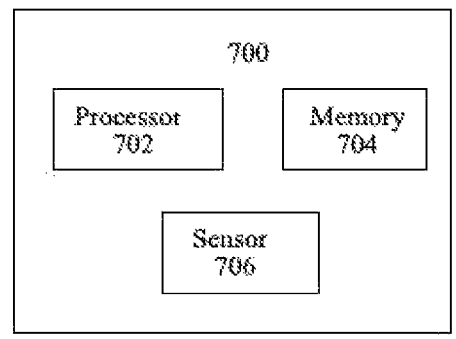
FIG. 8a illustrates a block diagram of a guided robot in accordance with an embodiment of the present disclosure.
Figure 8B:
FIG. 8b illustrates a block diagram of a system configured to aid a guided robot in accordance with an embodiment of the present disclosure.

FIG. 8a and FIG. 8b illustrate two exemplary route reservation systems. In FIG. 8a, the robot 700 is configured to reserve a route and navigate autonomously. The robot 700 may communicate with other robots or a central server to obtain location and movement information about other robots. The robot 700 includes one or more processors 702, a memory storage medium 704, and sensors 706. The one or more processors 702 are configured to carry out the route reservation methods as described above. The sensors 706 are configured to detect the location and/or status of the robot 700. The memory storage medium 704 is configured to store sensor data and software program needed for navigation. Alternatively, the robot 700 may rely on a remote server 750 partially or entirely to plan and determine a navigation route as shown in FIG. 8b.

The remote server 750 includes one or more processors 752, a memory storage 754, and transceivers 758. The remote server 750 is configured to reserve navigation routes for multiple robots and transmit reserved routes to the robots via the transceiver 708 and the transceiver 758.

Although the present disclosure is illustrated and described herein with reference to specific embodiments, the present disclosure is not intended to be limited to the details shown. Rather, various modifications may be made in the details within the scope and range of equivalents of the claims and without departing from the present disclosure.

What is claimed is:

1. A method for moving one or more automated guided robots, comprising:
receiving a first path through a path reservation by an automated guided robot, wherein the first path comprises one or more waypoints listed in a sequence;
storing the first path;
moving along the first path by reaching each of the one or more waypoints sequentially; and
reserving, by the automated guided robot, waypoints to be passed based on a principle of redundant reservation, wherein the redundant reservation is to reserve, in addition to the waypoints to be passed by the automated guided robot, several adjacent points after a farthest waypoint of the reserved waypoints to be passed, to avoid a straight line conflict between automated guided robots;
wherein the path reservation is performed as follows: a server starts a waypoint reservation from a position where the automated guided robot starts to move, and the waypoint reservation proceeds sequentially according to waypoints in a path, until the waypoint reservation fails, then the server feeds back information of all waypoints that have been successfully reserved to the automated guided robot, and the automated guided robot moves forward along the waypoints that have been successfully reserved, and continues to reserve a waypoint to be passed while moving forward;
the method further comprises: combining waypoints in some areas of a route into a group, and determining, by a server or the automatic guidance robot, whether a waypoint to be reserved is in the group, and if it is in the group, reserving the group first, and then reserving the waypoint in the group.

2. The method of claim 1, further comprising:
receiving a second path by the automated guided robot before the automated guided robot has reached an end of the first path, staying at the end of the first path when the automated guided robot does not receive the second path, and requesting the second path after a pre-determined time period has elapsed, wherein the second path comprises a sequence of one or more waypoints; and/or
marking the first path as completed when the automated guided robot reaches the end of the first path.

3. The method of claim 1, further comprising: receiving, by a server, position information sent by the automated guided robot in real time, analyzing a position of the automated guided robot to determine a waypoint, reserved point and/or path to be released, and release the waypoint, reserved point and/or path to be released; and/or mapping, by the server, a digital map based on information fed back by the automated guided robot, analyzing the position of the automated guided robot to determine a waypoint, reserved point and/or path to be released, and release the waypoint, reserved point and/or path to be released;
wherein the first path comprises waypoints that are not in collision with any waypoint on another path that has not been released, and wherein a collision between two waypoints occurs when there is an overlap between the two waypoints in space dimensions.

4. The method of claim 1, wherein each waypoint comprises a location and a size, and wherein the size corresponds to a space needed for accommodating the automated guided robot at the location;
the size is a maximum projection area of the automated guided robot as a whole on the ground, and the maximum projection area comprises maximum projection areas when moving and stationary, when turning and not turning, when loaded and unloaded, and when fetching and releasing a material.

5. The method of claim 4, wherein the each waypoint further comprises a timestamp for the automated guided robot to reach the each waypoint, and wherein a collision between two waypoints occurs when there is an overlap between the two waypoints in the time and the space dimensions;
in a three-dimensional space, a posture of the automated guided robot and a three-dimensional posture of a material shelf are included;
in a three-dimensional space, when sizes of two or more automated guided robots are overlapped at the same time stamp, there are two situations in which the two or more automated guided robots collide or not collide.

6. The method of claim 1, wherein each waypoint comprises a location and a size, and wherein the size corresponds to a space needed for accommodating the automated guided robot at the location; wherein the each waypoint further comprises a movement instruction for the automated guided robot to move, and wherein the movement instruction is used for guiding the automated guided robot to move forward in a diagonal oblique direction or a diagonal arc direction or to perform a multi-channel interspersed movement.

7. The method of claim 1, wherein a shape of each waypoint is changed based on at least one of the following conditions: turning of the automated guided robot, change of a fetching device, change of a mechanical arm, no-load, load and no action while stopping.

8. The method of claim 1, further comprising:
releasing a waypoint after the automated guided robot passes the waypoint.

9. The method of claim 1, wherein waypoints to be reserved comprise a farthest waypoint at which the automated guided robot stops after running from a current position and a waypoint at which the automated guided robot must stop during moving forward from the current position; and
the waypoint at which the automated guided robot must stop is a waypoint at which the automated guided robot needs to stop so as to perform an action or a waypoint at which the automated guided robot needs to stop so as to cooperate with manual operation.

10. The method of claim 1, wherein a construction form of the first path is:
completely composed of waypoints, or composed of waypoints combined with at least one of a point to be reserved, a line segment, a marker, and a regular point.

11. A system for guiding an automated guided robot, the system comprising a processor configured to:
receive a first path through a path reservation by an automated guided robot, wherein the first path comprises one or more waypoints listed in a sequence;
store the first path;
make the automated guided robot move along the first path by reaching each of the one or more waypoints sequentially; and
reserve, by the automatic guidance robot, waypoints to be passed based on a principle of redundant reservation, wherein the redundant reservation is to reserve, in addition to the waypoints to be passed by the automated guided robot, several adjacent points after a farthest waypoint of the reserved waypoints to be passed, to avoid a straight line conflict between automated guided robots;
wherein the path reservation is performed as follows: a server starts a waypoint reservation from a position where the automated guided robot starts to move, and the waypoint reservation proceeds sequentially according to waypoints in a path, until the waypoint reservation fails, then the server feeds back information of all waypoints that have been successfully reserved to the automated guided robot, and the automated guided robot moves forward along the waypoints that have been successfully reserved, and continues to reserve a waypoint to be passed while moving forward;
the processor is further configured to:
combine waypoints in some areas of a route into a group, and determine, by a server or the automatic guidance robot, whether a waypoint to be reserved is in the group, and if it is in the group, reserve the group first, and then reserve the waypoint in the group.

12. The system of claim 11, wherein the processor is further configured to:
receive a second path by the automated guided robot before the automated guided robot has reached an end of the first path, make the automated guided robot stay at the end of the first path when the automated guided robot does not receive the second path, and request the second path after a pre-determined time period has elapsed, wherein the second path comprises a sequence of one or more waypoints; and/or
mark the first path as completed when the automated guided robot reaches the end of the first path.

13. The system of claim 11, wherein the processor is further configured to: make a server receive position information sent by the automated guided robot in real time, analyze a position of the automated guided robot to determine a waypoint, reserved point and/or path to be released, and release the waypoint, reserved point and/or path to be released; and/or make the server map a digital map based on information fed back by the automated guided robot, analyze the position of the automated guided robot to determine a waypoint, reserved point and/or path to be released, and release the waypoint, reserved point and/or path to be released;
wherein the first path comprises waypoints that are not in collision with any waypoint on another path that has not been released, and wherein a collision between two waypoints occurs when there is an overlap between the two waypoints in space dimensions.

14. The system of claim 11, wherein each waypoint comprises a location and a size, and wherein the size corresponds to a space needed for accommodating the automated guided robot;
the size is a maximum projection area of the automated guided robot as a whole on the ground, and the maximum projection area comprises maximum projection areas when moving and stationary, when turning and not turning, when loaded and unloaded, and when fetching and releasing a material.

15. The system of claim 14, wherein the each waypoint further comprises a timestamp for the automated guided robot to reach the each waypoint, and wherein a collision between two waypoints occurs when there is an overlap between the two waypoints in the time and the space dimensions;
in a three-dimensional space, a posture of the automated guided robot and a three-dimensional posture of a material shelf are included;
in a three-dimensional space, when sizes of two or more automated guided robots are overlapped at the same time stamp, there are two situations in which the two or more automated guided robots collide or not collide.

16. The system of claim 11, wherein each waypoint comprises a location and a size, and wherein the size corresponds to a space needed for accommodating the automated guided robot; wherein the each waypoint further comprises a movement instruction for the automated guided robot to move, and wherein the movement instruction is used for guiding the automated guided robot to move forward in a diagonal oblique direction or a diagonal arc direction or to perform a multi-channel interspersed movement.

* * * * *